Nov. 11, 1941.                    A. L. STONE                    2,262,210
                    METHOD OF BUILDING UP TUBULAR JOINT MEMBERS
                    Filed Sept. 25, 1939            5 Sheets-Sheet 1
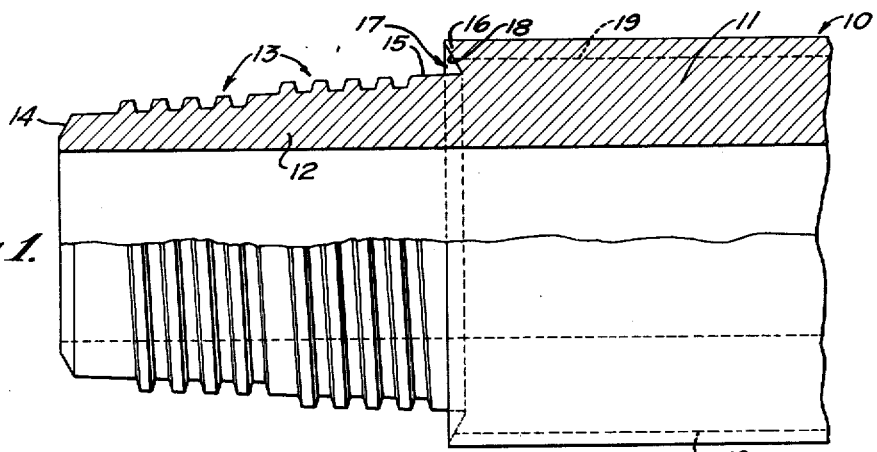
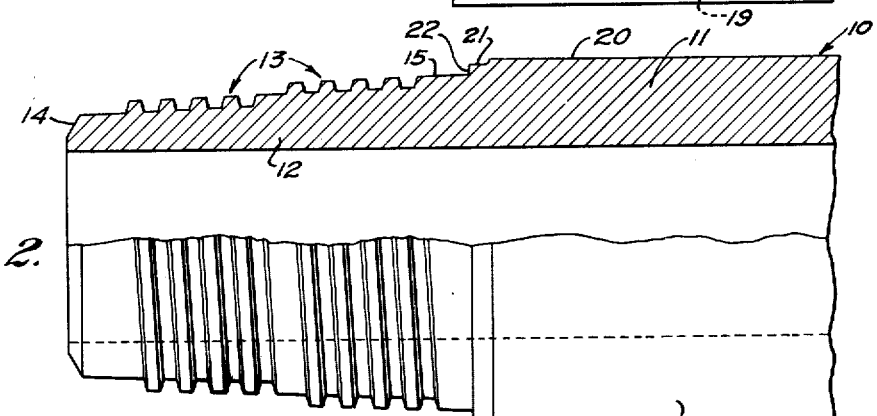
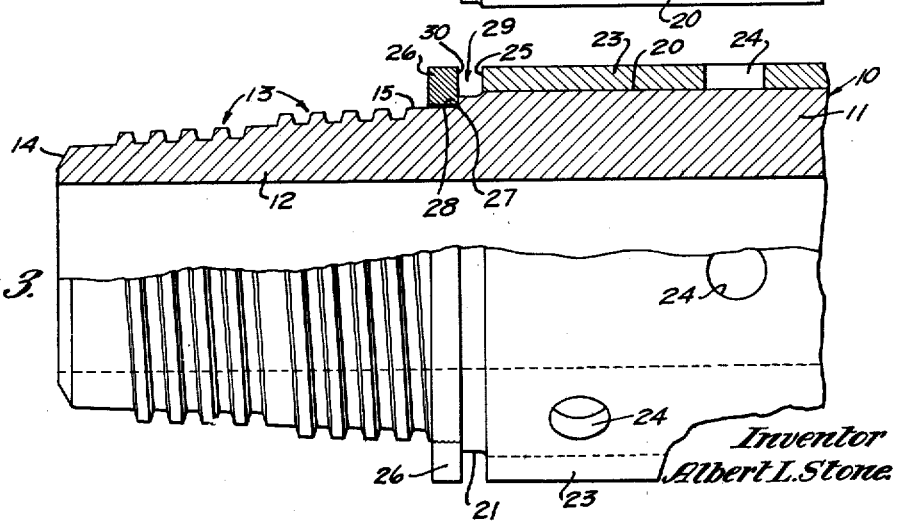
Inventor
Albert L. Stone
Bartholow + Scantlebury
Attorneys.

Nov. 11, 1941.   A. L. STONE   2,262,210
METHOD OF BUILDING UP TUBULAR JOINT MEMBERS
Filed Sept. 25, 1939   5 Sheets-Sheet 2

Inventor
Albert L. Stone.
Barklew & Scantlebury
Attorneys.

Nov. 11, 1941.  A. L. STONE  2,262,210

METHOD OF BUILDING UP TUBULAR JOINT MEMBERS

Filed Sept. 25, 1939  5 Sheets-Sheet 3.

Inventor
Albert L. Stone.

Attorneys.

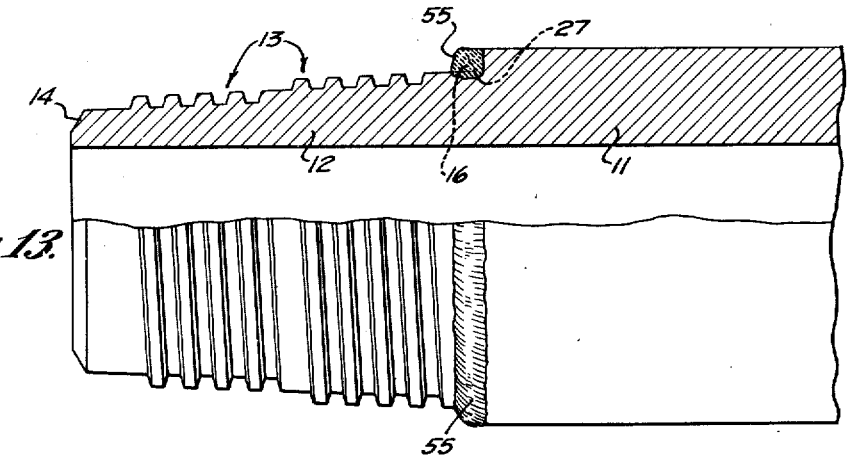
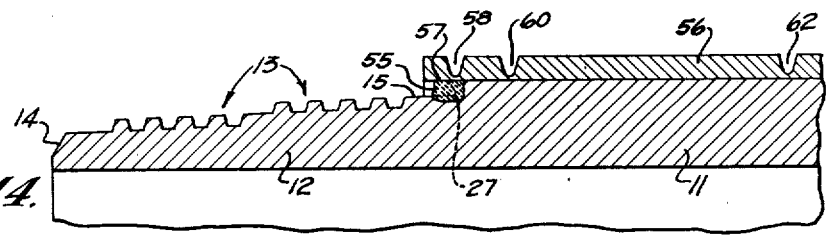
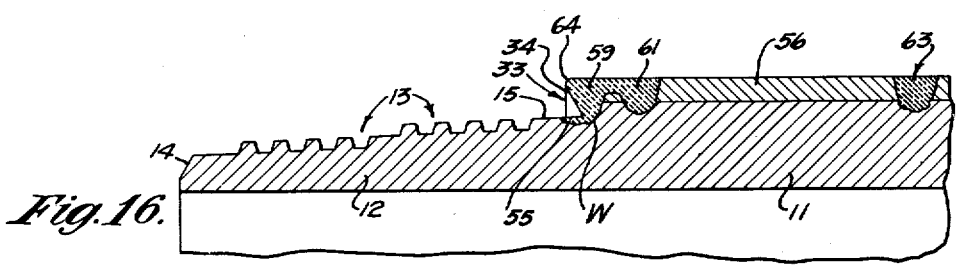
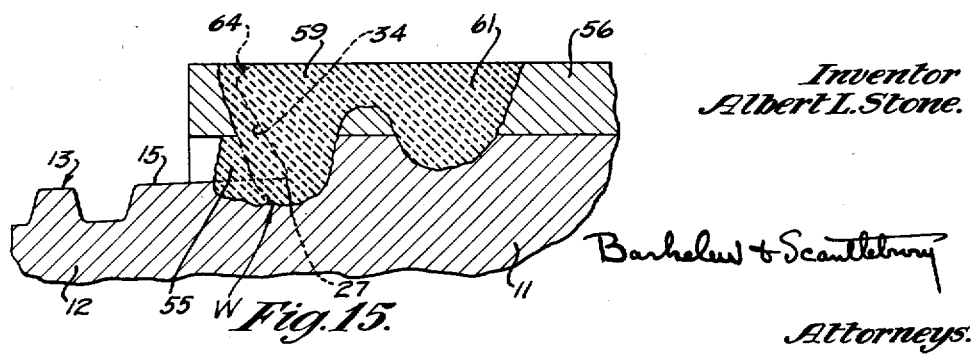

Nov. 11, 1941.   A. L. STONE   2,262,210
METHOD OF BUILDING UP TUBULAR JOINT MEMBERS
Filed Sept. 25, 1939   5 Sheets-Sheet 5

Inventor
Albert L. Stone.

Bartholow & Scantlebury
Attorneys.

Patented Nov. 11, 1941

2,262,210

UNITED STATES PATENT OFFICE 2,262,210

METHOD OF BUILDING UP TUBULAR JOINT MEMBERS

Albert L. Stone, Palos Verdes Estates, Calif., assignor to Hydril Company of California, Los Angeles, Calif., a corporation of California Application September 25, 1939, Serial No. 296,452

2 Claims. (Cl. 29—148.2)

This invention relates to methods of building up or reconditioning tubular joint members, and is more particularly concerned with such a method applied to worn tool joints of drill pipe for oil well strings.

Such tool joints are tubular and include a body portion and a reduced diameter, externally threaded pin portion at one or both ends of the body portion.

An annular shoulder extends transversely from the base of the pin portion to the outer periphery of the body portion. While the invention may be utilized to advantage in connection with any type of tool joint susceptible of the described method of reconditioning, repair and external reinforcement or protection, it is of particular advantageous application to tool joints of the general character set forth in Patent No. 1,932,427 issued to Frederick Stone on Well pipe joint, October 31, 1933. Therefore, I will describe the invention as applied to this particular type of tool joint, but this is not to be construed as limiting the invention, considered in its broader aspects.

In the joint thus chosen for illustrative purposes, an overhanging lip is formed on the end of the body portion adjacent the base of the pin portion, the lip defining, with the periphery of the pin base, a substantially V-shaped groove, one defining wall presenting a conical shoulder facing towards the free end of the pin. This shoulder is carefully machined to be in a very accurately spaced relation with a shoulder formed at the free end of the pin portion and so it may form a fluid-tight seal with a mating shoulder on a complementary joint box. The significance of the shouder accuracy and its position relative to other elements of the tool joint, is fully pointed out in the above mentioned patent.

Such tool joints are exposed to extremely severe service conditions, and, being operated in the presence of highly abrasive drilling mud, wear thin in a relatively short time, the external peripheral wear reducing, of course, the radial extent of the described conical shoulders. It is obvious that this wear not only creates a final hazardous condition, but even before that critical condition is reached the shoulder wear (or its spread by reason of reduced backing-up material) may greatly decrease the fluid-holding efficiency of the joint.

It is therefore a general object of the present invention to provide means whereby such joints, after considerable wear, may be expeditiously and relatively cheaply reconditioned, thereby greatly increasing their useful life with full efficiency, the reconditioning being such that it in no way harmfully distorts or weakens the joint but on the contrary strengthens and reinforces it even to the point of giving it greater radial bulk and wear resistant qualities than possessed by the original joint.

Since I first introduced the general solution of a built-up reconditioning method, it has been seized upon by many workers in the field, for the results have proved of great economic value since thousands of expensive joints which would theretofore have been scrapped have been put back into long-extended useful service.

In my copending application entitled Protection and reconditioning of well pipe joints, Ser. No. 225,362, filed August 17, 1938, I have disclosed several reconditioning methods which have met with success. However, I have since found it necessary to concern myself more particularly with the problem of reforming the conical shoulders for it will be recognized that since these shoulders must mate with complementary shoulders on the box, must be accurately spaced with relation to otther joint elements, and must take both fluid and mechanical pressural strains of a high order, the reconditioning must be of a nature which will permit the attainment of all these ends. It is therefore among the objects of the present invention to provide a reconditioning method which will fulfill all the required conditions, and yet do this without destroying the economic advantage of reconditioned joints. In other words, the end is attained by relatively rapid manufacturing steps and at relatively low cost.

While the invention is thus particularly adaptable to the reconditioning of worn joints, certain of its principles are adapted to the fabrication of new joints, as will later appear, and certain of the claims are inclusive of that aspect of the invention.

Other objects and features of novelty of the invention will be made apparent in the following detailed description, reference being made to the accompanying drawings, in which:

Fig. 1 is a fragmentary sectional view through an unworn tool joint, showing in dotted lines how the wear may develop;

Fig. 2 is a view similar to Fig. 1 but showing the first step in reconditioning a worn tool joint, in following one embodiment of my reconditioning method;

Figs. 3, 4 and 5 show progressive steps in following this embodiment;

Figure 4:
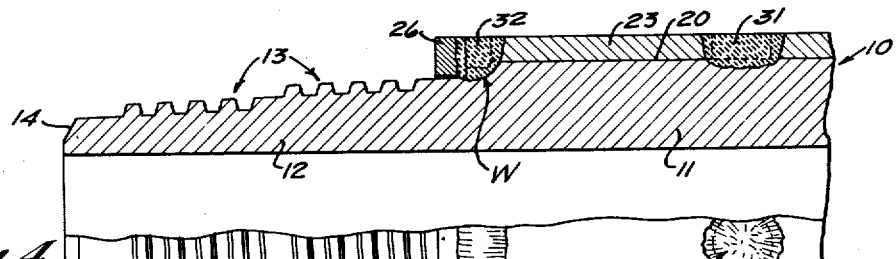

Figs. 13 to 16, inclusive, show successive steps in a still further variational embodiment of the invention; and Figs. 17 to 20, inclusive, show the adaptation of the invention to the fabrications of a new joint.

I will first describe Fig. 1 which, in full lines, represents one end of an unworn tool joint and, in dotted lines, shows how wear may occur. As said previously, the choice of this particular type of joint for illustrative purposes is not to be construed as limitative on the broader aspects of the invention, though the invention may be applied with particular advantage to this type of joint.

Ordinarily such tool joints are double-ended, and it will be understood that in such cases both ends may be treated in the manner here descried as applying to only one end.

Tubular tool joint member 10, made for instance, of steel, includes a relatively large diameter, cylindric body portion 11 and a relatively small-diameter pin portion 12. The pin portion has an external two-step thread 13, there being a tapered nose 14 at the free end of the pin portion, while there is an unthreaded and slightly tapered peripheral extent 15 at the base end of the pin portion. For purposes of clearer illustration, the taper of extent 15 is here shown exaggerated in degree.

Body portion 11 has an overhanging end lip 16 which, with peripheral extent 15 defines a substantially V-shaped groove 17, the lip face 18 presenting a conical shoulder facing towards the free end of the pin portion and tapering in a direction opposite that of nose 14. For reasons fully set forth in the aforementioned patent, shoulder 18 is very accurately spaced from nose 14 and is carefully machined so it may mate with the free end of a complementary box (not shown) to form a fluid tight joint. Lip 16 is also dependent upon to hold the interfitting box end from diametral spread when the box and pin are subjected to longitudinal compressive strains by reason of the threaded joint between member 10 and the box being made up with predetermined tightness. It will thus be seen that shoulder 18 is a critical element of the joint, both as to its location and as to its formation. In connection with the latter aspect, it will be seen that any re-formation of the shoulder during reconditioning operations must leave that shoulder so it will take with full efficiency the severe fluid and mechanical pressural strains to which it will later be exposed in use.

Dotted lines 19 indicate how member 10 may be worn down through peripheral wear, which, of course, correspondingly reduces the radial extent of shoulder 18. Usually, the wear is such that the body portion becomes eccentric or out-of-round. In the figures which follow, the first step of each variational embodiment has been indicated as involving a truing of the body portion with respect to the member-axis by a turning operation. The extent of turning will depend upon the condition of each given joint and, of course, in some instances this preliminarily truing is not essential, and therefore the indication of an initial cut is not to be construed as limitative on the broader aspects of the invention.

In Fig. 2 the body portion 11 has been turned true and is, of course, of less diameter than the worn diameter 19 of Fig. 1. Peripheral extent 15, which is intended to seat tightly on a complementary box shoulder (not shown) is left undisturbed, but lip 16 is cut down below the turned body-face 20 to form step 21, the outer end 22 of the step being square-cut.

A sleeve 23 of wear resistant material, such as manganese steel, is fitted about body-face 20, the sleeve being pre-formed with apertures 24 to receive subsequent plug-welds. The end 25 of the sleeve is approximately opposite the inner end of step 21. Ring or sleeve 26, preferably of the same material as sleeve 23, is then slipped over peripheral extent 15, the taper of said extent being such as to give the ring force-fit with the pin adjacent shoulder 22 at point 27, this point and hence corner 28 of ring 26 lying at a point corresponding with the bottom of groove 17 of the original joint member and the substantially coincident point where the bottom of the re-formed groove is to lie. It will be seen that ring 26 inclusively occupies the position previously occupied by lip 16.

The thicknesses of sleeve 23 and ring 26 are preferably such as to give outside diameters which will restore the joint at least to its original diameter, though it is sometimes desirable to increase the ring and sleeve thicknesses to an extent which will make the over-all diameter of the member even greater than that of the original joint and thus give added wear-taking material and further increasing the useful life of the joint member. This latter is the condition illustrated in Fig. 3.

It will be noted a groove 29 is defined by extent 15 and opposed end shoulders 25 and 30 of sleeve 23 and ring 26, respectively. Sleeve 23 is then weld-integrated with body portion 11 by plug welds 31 (Fig. 4). Groove 29 is then filled with weld material 32, the welding operation including sufficient melt-welding to cause weld-penetration into the body portion, pin portion, ring and sleeve, approximately to the extent indicated in Fig. 4, thus weld-integrating all said penetrated elements by the weld-zone W.

Groove 33 (Figs. 5 and 6) is then cut to correspond approximately with original groove 17 and with the conical shoulder 34 corresponding with original shoulder 18 and spaced properly with relation to nose 14. It will be seen that lip 35 may be partially made up of weld material and partially of the stock of ring 26 impregnated to greater or lesser extent by the weld material. Lip 35 is thus integrated by weld zone W with sleeve 23, body portion 11 and (at 36) with pin portion 12, the integration being such that groove 33 is bounded by an integrated surface which offers no opportunity for fluid leakage between the original stock and the welded-on material, nor for spreading failure when the joint is subsequently exposed to heavy fluid or mechanical pressural effects.

Figure 6:
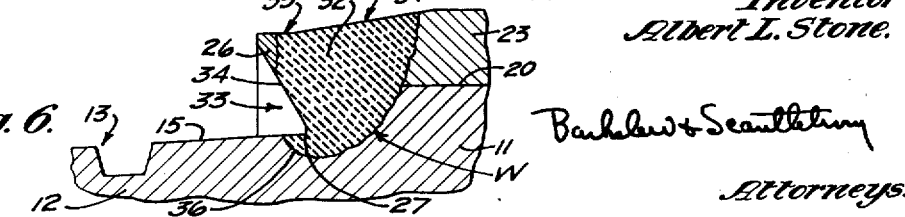
Fig. 6 is an enlarged, fragmentary section of the welded shoulder shown in Fig. 5.

The top of lip 35 may be cut down, as in Fig. 6, to correspond with the outside diameter of original lip 16 and weld 32 then turned off as at 37 to merge that diameter into the outside diameter of sleeve 23.

In the description of the following variations, the same reference numerals will be given to parts which correspond to like elements in Figs. 1 to 6, without need of repeated individual description.

Figure 7:
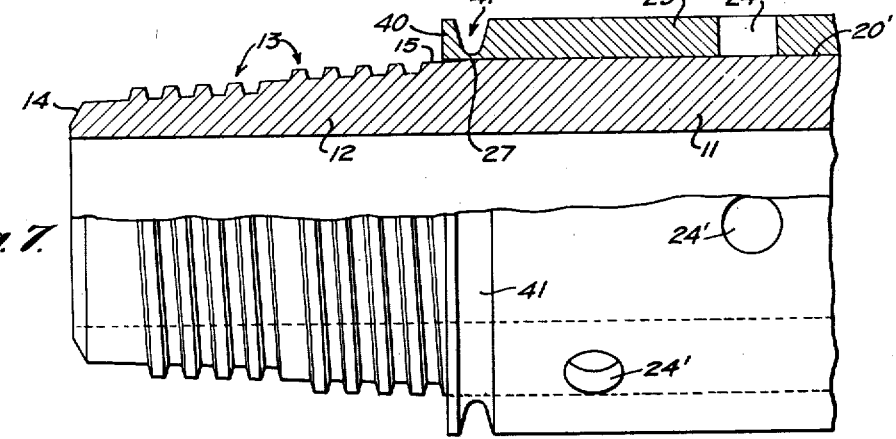
Figs. 7 and 8 show successive steps in a variational embodiment of the invention.

In Fig. 7, the body portion is cut down to point 27, and sleeve 23' is fitted about the cut-down body with its end 40 projecting over peripheral extent 15 of pin portion 12. A groove 41 is cut annularly about sleeve 23' either before or after the sleeve is applied, but, in either event, the bottom of the groove is preferably located directly over point 27. In some cases, it is desirable to cut the groove clear through to the joint stock after the sleeve is applied but before the welding operation starts, the portion 40 having sufficient area of tight fit with taper 15 to hold it, as a ring, on the joint.

Figure 8:
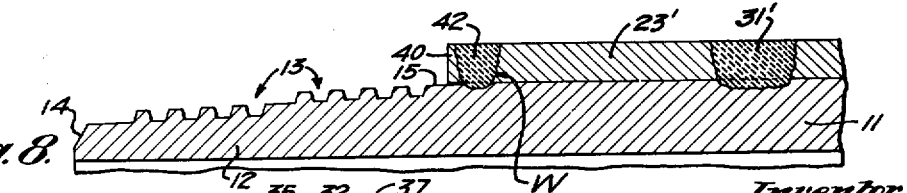

The sleeve is plug-welded at 31", or otherwise suitably integrated with the body portion at points spaced from end 40. The bottom of groove 41 is then "melt-welded" through and filled with weld material 42 (Fig. 8) thus integrating the sleeve material originally at opposite sides of the groove with body and pin portions, which will give the same general effect as that illustrated in Fig. 5, with end 40 supplanting ring 26. The end-groove, overhanging lip and joint shoulder will then be formed in a manner similar to that previously described and illustrated in Figs. 5 and 6.

Figure 9:
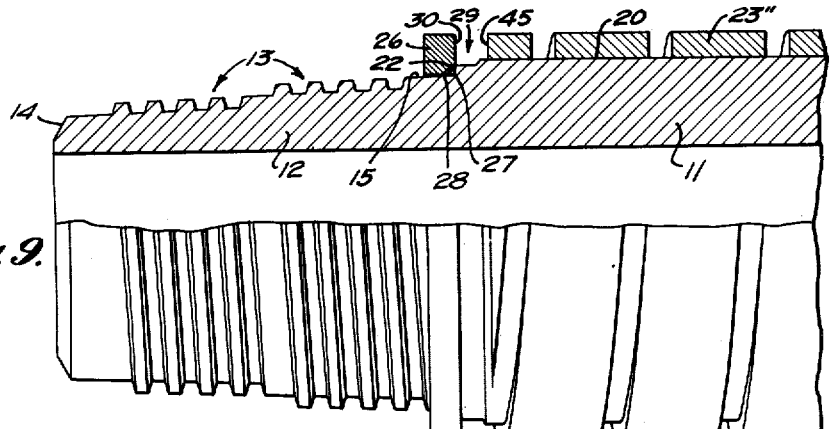
Figs. 9 and 10 show successive steps in another variational embodiment of the invention.
Figure 10:
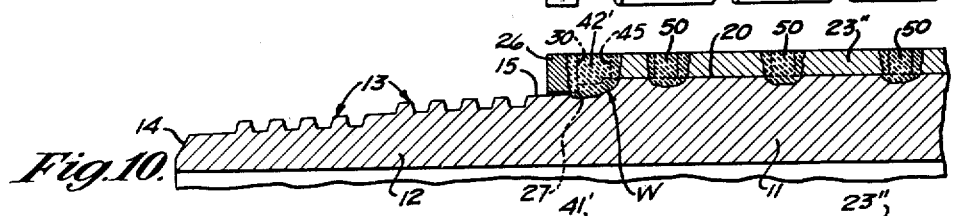

In Figs. 9 and 10, the reconditioning method and means illustrated may be the same as described in connection with Figs. 1 to 6, with the exception that, instead of utilizing a full-tube sleeve, there is here shown a sleeve or sheathing in the form of a spiral wrapping 23''', and the end 45 of that wrapping stops a little short of the end of step 21. In this case, the sheathing is weld-integrated with the body portion of the joint by filling in the spaces between the spiral coils as at 50, and weld material 42' extends beyond step 21 and to sheathing end 45.

Figure 5:
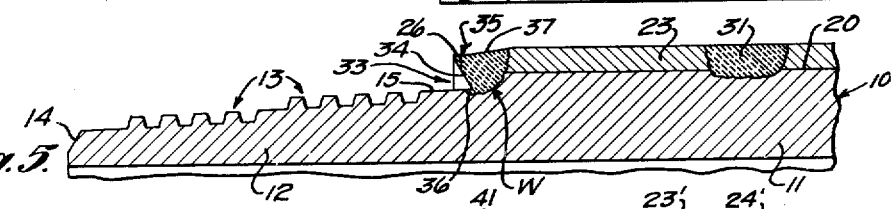

The end-groove, overhanging lip and joint shoulder will then be formed in a manner similar to that previously described and illustrated in Figs. 5 and 6.

Figure 11:
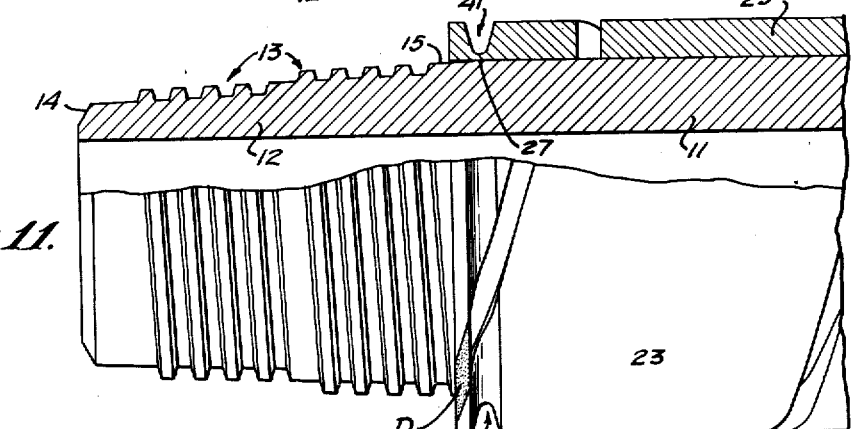
Figs. 11 and 12 show successive steps in another variational embodiment of the invention.
Figure 12:
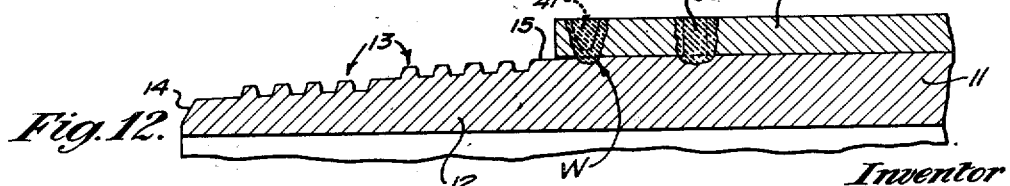

In Figs. 11 and 12, the method is a combination of the methods shown in Figs. 7–8 and Figs. 9–10, that is, a spiral sheath or sleeve is used, as in Figs. 9 and 10, but this sleeve is extended over peripheral extent 15 and is provided with a weld groove 41' located over point 27. Groove 41' is welded through as described in connection with Figs. 7 and 8, while the major portion of the sleeve is welded to the body portion at 50' between the coils of the spiral, as described in connection with Figs. 9 and 10, a suitable dam D preferably being arranged at the outer junction of the spiralled groove and groove 41'.

The end-groove, overhanging lip and joint shoulder will then be formed in a manner similar to that previously described and illustrated in Figs. 5 and 6.

In Figs. 13 to 16, inclusive, another variation is shown. The first step is to fill groove 16 with weld material 55, preferably extending this "fill" over peripheral extent 15 even beyond the overhanging lip 16. Weld material 55 penetrates, of course, the lip, pin and body portions of the joint member as indicated in Fig. 13.

The body portion, lip and weld 55 are then turned down as indicated in Fig. 14, and a wear resistant sleeve 56 is then fitted about the joint member as illustrated, the sleeve fitting the turned, peripheral face 57 of weld 55 as well as the turned face of the body portion.

Either before or after application of the sleeve, that sleeve is annularly grooved at 58, the groove being located directly over point 27. The bottom of groove 58 is then welded through and the groove filled with weld material 59, giving the general effect of Fig. 15, weld material 59 integrating the sleeve material at opposite sides of the original weld-groove, and, by virtue of its integration with weld material 55, integrating the sleeve material with the pin and body portions. Weld zone W thus includes integrated welds 55 and 59.

The end-groove, overhanging lip and joint shoulder will then be formed in a manner similar to that previously described and illustrated in Figs. 5 and 6.

The end of the lip may be chamfered as at 64, if desired.

If desired, a second weld groove 60 may be provided in sleeve 56, adjacent groove 58, and when the bottom of this second weld-groove is welded through and the groove filled with weld-material 61, that material 61 additionally integrates the sleeve and body portion and, by virtue of the weld integration between material 59 and 61, there is a further tie between all the named elements.

Additional weld-groove 62 may be provided in sleeve 56 at a point longitudinally spaced from groove 61 and used for providing a melt-weld bond 63 between body portion 11 and sleeve 56.

In Figs. 17 to 20, inclusive, is shown an adaptation of the method to the fabrication of new joints. One of the distinct advantages gained by this adaptation, is the fact that it enables the use of relatively thin-walled tubing for the body portion of the joint, the extra stock for supplying the central enlargement, and the shoulders at the ends of that enlargement, being supplied by way of a sleeve which is weld-integrated with the body and pin portions. Obviously, this is of economic advantage over the usual custom of starting with tubing stock whose wall thickness is, throughout, that of the central enlargement and then cutting down the ends to the required reduced-diameter of the threaded pins. But in building up the stock with the sleeve and with the rigid requirements as to the shoulder characteristics, spoken of above, it will be seen that this expedient calls for certain precautionary measures—measures which this invention supplies.

Figure 17:
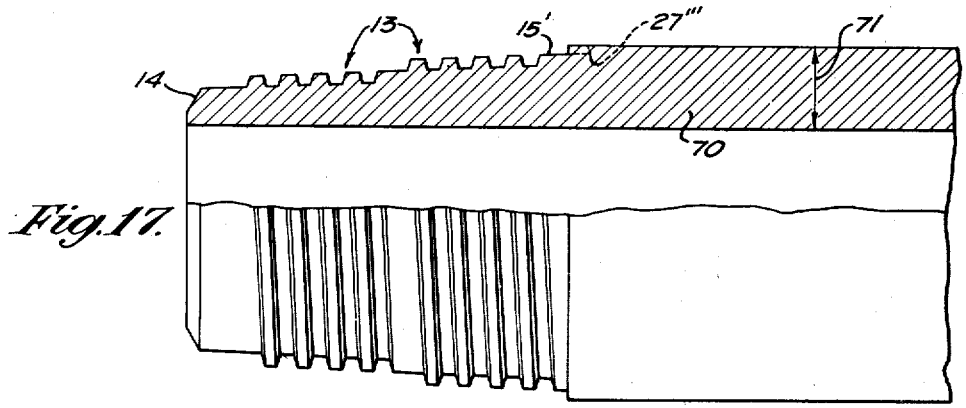
Figure 18:
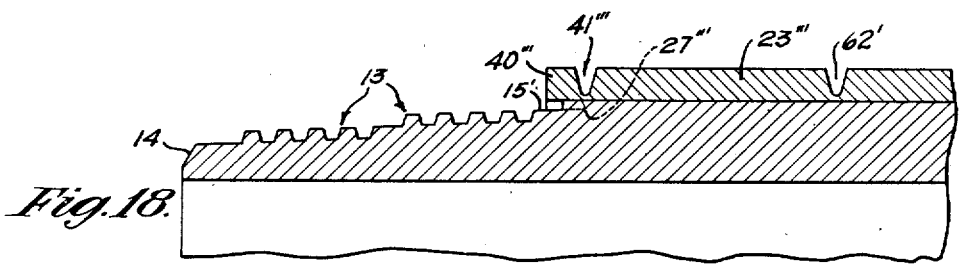
Figure 19:
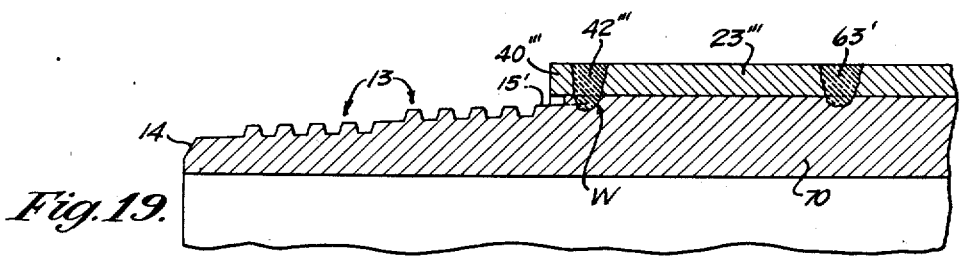
Figure 20:
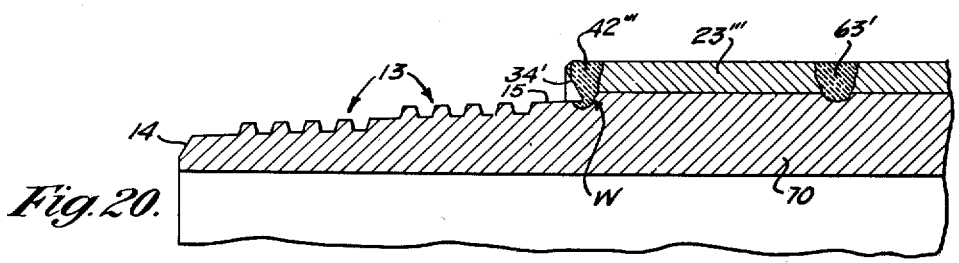

In Fig. 17, the operations start with a tube 70 whose normal thickness is represented at 71, which is considerably less than the final overall thickness the joint is to possess. Threads 13 and nose 14 are formed at one end of the tube, with extent 15' stopping short of the point 27''' where shoulder 34' (Fig. 20) is ultimately to start. Sleeve 23'''', which may be chosen from a stock of sleeve of different thicknesses to suit the particular thickness-requirement of any given job, is then applied (Fig. 18) in the manner described in connection with Fig. 7, with groove 41''' located over point 27'''. The weld is then accomplished (Fig. 19) in the manner described in connection with Fig. 8, and the joint is finished off (Fig. 20) in the manner described in connection with Fig. 6 (except that the cut 37 need not necessarily be taken), with all the advantages described in connection with Fig. 6. An additional weld-bond between sleeve and tube may be provided at 63', as described in connection with Figs. 14 and 16.

While I have described preferred embodiments of my invention, it will be understood various changes may be made without departing from the spirit and scope of the appended claims.

I claim:

1. The method of reconditioning a tubular joint member that has a body portion, a reduced-diameter pin portion at one end of the body portion and an annular shoulder extending transversely of the joint member from the body portion to the pin portion and in predetermined longitudinally spaced relation with the free end of the pin; that includes applying a ring of wear resistant material to the pin portion and tightly fitting that portion at the point where the reformed transverse shoulder is to join the pin portion, applying a sleeve of wear-resistant material to the body portion of the member with the end of the sleeve spaced longitudinally of the joint from the end of the ring, weld-integrating the ring and sleeve to one another and to the body and pin portions, the weld extending substantially to the outer peripheries of the ring and sleeve, and cutting a transverse shoulder in the ring and weld in said predetermined spaced relation with the free end of the pin.

2. The method of reconditioning a tubular joint member that has a body portion, a reduced-diameter pin portion at one end of the body portion and an overhanging lip on the body portion that presents a conical shoulder extending substantially from the periphery of the body portion to the periphery of the pin portion and facing towards the free end of the pin portion; that includes turning the body portion true with respect to the member axis, cutting down said overhanging lip, applying a ring of wear-resistant material to the pin portion where it will occupy the space originally occupied by the lip and tightly fitting that portion at the point where the reformed conical shoulder is to join the pin portion, applying a sleeve of wear-resistant material to the body portion of the member with the end of the sleeve spaced longitudinally of the joint from the end of the ring, weld-integrating the ring and sleeve to one another and to the body and pin portions, the weld extending substantially to the outer peripheries of the ring and sleeve, and cutting a conical shoulder in the ring and weld in said predetermined spaced relation with the free end of the pin.

ALBERT L. STONE.

---

CERTIFICATE OF CORRECTION.

Patent No. 2,262,210.

November 11, 1941.

ALBERT L. STONE.

It is hereby certified that error appears in the printed specification of the above numbered patent requiring correction as follows: Page 4, first column, line 17, claim 1, for "aid" read --end--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.

I claim:

1. The method of reconditioning a tubular joint member that has a body portion, a reduced-diameter pin portion at one end of the body portion and an annular shoulder extending transversely of the joint member from the body portion to the pin portion and in predetermined longitudinally spaced relation with the free end of the pin; that includes applying a ring of wear resistant material to the pin portion and tightly fitting that portion at the point where the re-formed transverse shoulder is to join the pin portion, applying a sleeve of wear-resistant material to the body portion of the member with the end of the sleeve spaced longitudinally of the joint from the end of the ring, weld-integrating the ring and sleeve to one another and to the body and pin portions, the weld extending substantially to the outer peripheries of the ring and sleeve, and cutting a transverse shoulder in the ring and weld in said predetermined spaced relation with the free end of the pin.

2. The method of reconditioning a tubular joint member that has a body portion, a reduced-diameter pin portion at one end of the body portion and an overhanging lip on the body portion that presents a conical shoulder extending substantially from the periphery of the body portion to the periphery of the pin portion and facing towards the free end of the pin portion; that includes turning the body portion true with respect to the member axis, cutting down said overhanging lip, applying a ring of wear-resistant material to the pin portion where it will occupy the space originally occupied by the lip and tightly fitting that portion at the point where the re-formed conical shoulder is to join the pin portion, applying a sleeve of wear-resistant material to the body portion of the member with the end of the sleeve spaced longitudinally of the joint from the end of the ring, weld-integrating the ring and sleeve to one another and to the body and pin portions, the weld extending substantially to the outer peripheries of the ring and sleeve, and cutting a conical shoulder in the ring and weld in said predetermined spaced relation with the free end of the pin.

ALBERT L. STONE.

---

CERTIFICATE OF CORRECTION.

Patent No. 2,262,210.  November 11, 1941.

ALBERT L. STONE.

It is hereby certified that error appears in the printed specification of the above numbered patent requiring correction as follows: Page 4, first column, line 17, claim 1, for "aid" read --end--; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.

CERTIFICATE OF CORRECTION.

Patent No. 2,262,210. November 11, 1941.

ALBERT L. STONE.

It is hereby certified that error appears in the printed specification of the above numbered patent requiring correction as follows: Page 4, first column, line 17, claim 1, for "aid" read -- end --; and that the said Letters Patent should be read with this correction therein that the same may conform to the record of the case in the Patent Office.

Signed and sealed this 30th day of December, A. D. 1941.

(Seal)

Henry Van Arsdale,
Acting Commissioner of Patents.